United States Patent
Jensen (10) Patent No.: US 10,732,593 B2
(45) Date of Patent: Aug. 4, 2020

(54) METHODS AND APPARATUS FOR COORDINATING OPERATION OF VALVES

(71) Applicant: Fisher Controls International LLC, Marshalltown, IA (US)

(72) Inventor: Kurtis K. Jensen, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 294 days.

(21) Appl. No.: 15/799,509

(22) Filed: Oct. 31, 2017

(65) Prior Publication Data
US 2019/0128292 A1 May 2, 2019

(51) Int. Cl.
*G05B 19/042* (2006.01)
*F15B 19/00* (2006.01)
(Continued)

(52) U.S. Cl.
CPC ...... *G05B 19/0421* (2013.01); *F15B 15/2815* (2013.01); *F15B 19/005* (2013.01); *F16K 31/02* (2013.01); *F16K 31/05* (2013.01); *F16K 37/0041* (2013.01); *G05B 15/02* (2013.01); *G05B 19/042* (2013.01); *G05B 19/0426* (2013.01); *G05B 19/19* (2013.01); *G05D 7/06* (2013.01); *H01F 7/1844* (2013.01); *G05B 7/00* (2013.01); *G05B 2219/25312* (2013.01);
(Continued)

(58) Field of Classification Search
CPC ........ F16K 31/05; F16K 31/02; H01F 7/1844; G05B 19/0426; G05B 19/0421; G05B 2219/45006; G05D 7/06
See application file for complete search history.

(56) References Cited

U.S. PATENT DOCUMENTS 6,067,782 A * 5/2000 Diekhans ............. A01B 69/007
56/10.2 A
8,620,559 B2 * 12/2013 Jehle ..................... F02D 41/266
701/102
(Continued)

FOREIGN PATENT DOCUMENTS

CA 2727208 7/2012

OTHER PUBLICATIONS

Cheong et al., "Bumpless Transfer for Adaptive Switching Controls," [https://pdf.sciencedirectassets.com/314898/], Proceedings of the 17th World Congress, The International Federation of Automatic Control, Seoul, Korea, Jul. 6-11, 2008, pp. 14415-14420, retrieved on May 13, 2019, 6 pages.
(Continued)

*Primary Examiner* — Atif H Chaudry
(74) *Attorney, Agent, or Firm* — Hanley, Flight & Zimmerman, LLC (57) ABSTRACT

Methods and apparatus for coordinating operation of valves are disclosed. In some examples, an apparatus includes a valve controller to receive a first signal from a first control system to change an operating state of a valve, the valve controller is to provide the first control system exclusive control of the valve. In some examples, the valve controller is to receive a second signal from a second control system requesting permission to operate the valve, and send a response to the second control system indicating the first control system has exclusive control of the valve and has changed an operating state of the valve.

20 Claims, 5 Drawing Sheets

(51) Int. Cl.
| | |
|---|---|
| *F16K 37/00* | (2006.01) |
| *F16K 31/02* | (2006.01) |
| *G05B 15/02* | (2006.01) |
| *F15B 15/28* | (2006.01) |
| *G05B 19/19* | (2006.01) |
| *G05D 7/06* | (2006.01) |
| *H01F 7/18* | (2006.01) |
| *F16K 31/05* | (2006.01) |
| *G05B 7/00* | (2006.01) |

(52) U.S. Cl.
CPC ............... *G05B 2219/41311* (2013.01); *G05B 2219/45006* (2013.01)

(56) References Cited

U.S. PATENT DOCUMENTS

| | | | |
|---|---|---|---|
| 2009/0038185 A1 | 2/2009 | Winistoerfer et al. | |
| 2013/0152673 A1* | 6/2013 | Young | F23N 1/002 |
| | | | 73/40.7 |
| 2014/0129036 A1* | 5/2014 | Durbhaka | G05B 15/02 |
| | | | 700/282 |
| 2015/0286205 A1 | 10/2015 | Menet | |

OTHER PUBLICATIONS

International Searching Authority, "Search Report," issued in connection with International Patent Application No. PCT/US2018/055979, dated Feb. 13, 2019, 6 pages.

International Searching Authority, "Written Opinion," issued in connection with International Patent Application No. PCT/US2018/055979, dated Feb. 13, 2019, 9 pages.

* cited by examiner

METHODS AND APPARATUS FOR COORDINATING OPERATION OF VALVES

FIELD OF THE DISCLOSURE

This disclosure relates generally to methods and apparatus for operating valves and, more specifically, to methods and apparatus for coordinating operation of valves.

BACKGROUND

In conventional process control environments, valves are placed in a manual mode for routine maintenance. For example, a valve of the process control environment may be placed in a manual mode via a local interface at a valve controller. In some examples, a physical lock may be placed on the valve to prevent other valve controllers from controlling the valve during maintenance.

SUMMARY

Methods and apparatus for coordinating operation of valves are disclosed. In some disclosed examples, an apparatus includes a valve controller to receive a first signal from a first control system to change an operating state of a valve, the valve controller is to provide the first control system exclusive control of the valve. In some disclosed examples, the valve controller is to receive a second signal from a second control system requesting permission to operate the valve, and send a response to the second control system indicating the first control system has exclusive control of the valve and has changed an operating state of the valve.

In some disclosed examples, a method includes receiving a first signal from a first control system at a valve controller to change an operating state of a valve, the valve controller is to provide the first control system exclusive control of the valve. In some disclosed examples, the method includes receiving a second signal from a second control system at the valve controller requesting permission to operate the valve, and sending a response to the second control system indicating the first control system has exclusive control of the valve and has changed an operating state of the valve.

In some disclosed examples, a non-transitory computer readable medium includes instructions that, when executed, cause a valve controller to receive a first signal from a first control system to change an operating state of a valve, the valve controller is to provide the first control system exclusive control of the valve. In some disclosed examples, the non-transitory computer readable medium includes instructions that, when executed, cause a valve controller to receive a second signal from a second control system requesting permission to operate the valve, and send a response to the second control system indicating the first control system has exclusive control of the valve and has changed an operating state of the valve.

BRIEF DESCRIPTION OF THE DRAWINGS

The figures disclosed herein are not to scale. Wherever possible, the same reference numbers will be used throughout the drawings and accompanying written descriptions to refer to the same or like parts.

DETAILED DESCRIPTION

Conventional process control environments may include one or more control system(s) in communication with multiple valve controllers independently controlling corresponding ones of multiple valves. As such, during an event (e.g., maintenance, shutdown operations, start-up operation, etc.), multiple control systems may be attempting to operate a given valve. For example, a first control system may be performing maintenance on a valve and have exclusive control of the valve. During the maintenance, an event may occur and a second control system may request to operate the valve, but is unable to do so. This is problematic because the second control system is unable to identify which control system has control of the valve and is unable to operate the valve to address the event.

In conventional process control environments, a first control system may operate using a first communication protocol (e.g., MODBUS, HART, Profibus, DeviceNet, Profinet, Ethernet IP, Foundation Fieldbus, etc.) while a second control system may operate using a second communication protocol different than the first communication protocol.

Additionally, for a given valve, one communication protocol may have privileges to override another communication protocol. For example, a first control system may need to perform maintenance on a valve and may operate the valve to a manual mode using a MODBUS communication protocol. During the maintenance, a second control system using a HART communication protocol may override the first control system and operate the valve to an automatic mode. Overriding the first control system compromises the maintenance and maybe unsafe because the first control system is no longer able to operate the valve.

Unlike the conventional process control environments described above, the methods and apparatus disclosed herein enable a valve controller to coordinate the operation of a valve amongst multiple control systems between an automatic mode and a manual mode.

As used herein, the term "automatic mode" refers to a valve controller automatically outputting a signal that includes and/or carries data and/or information constituting and/or indicative of respective control signals to control a corresponding valve. As used herein, the term "manual mode" refers to the valve controller being manipulated locally (e.g., a local screen, pushbuttons, a maintenance handheld that connects to the valve controller, etc.) and/or via a control system to output the signal to control the corresponding valve.

Implementation of a valve controller to coordinate the operation of a valve amongst multiple control systems provides several advantages relative to the above described conventional process control environments. For example, because the disclosed valve controller receives a first signal from a first control system to operate a valve and provides the first control system exclusive control of the valve, other control systems are unable to control the valve. Accordingly, the first control system is the exclusive operator of the valve and may not be overridden by another control system, unless the valve is operated locally. Additionally, because the disclosed valve controller sends responses indicating which control system has exclusive control of the valve, any requesting control system can quickly identify which control system is operating the valve during emergency situations, for example.

Figure 1:
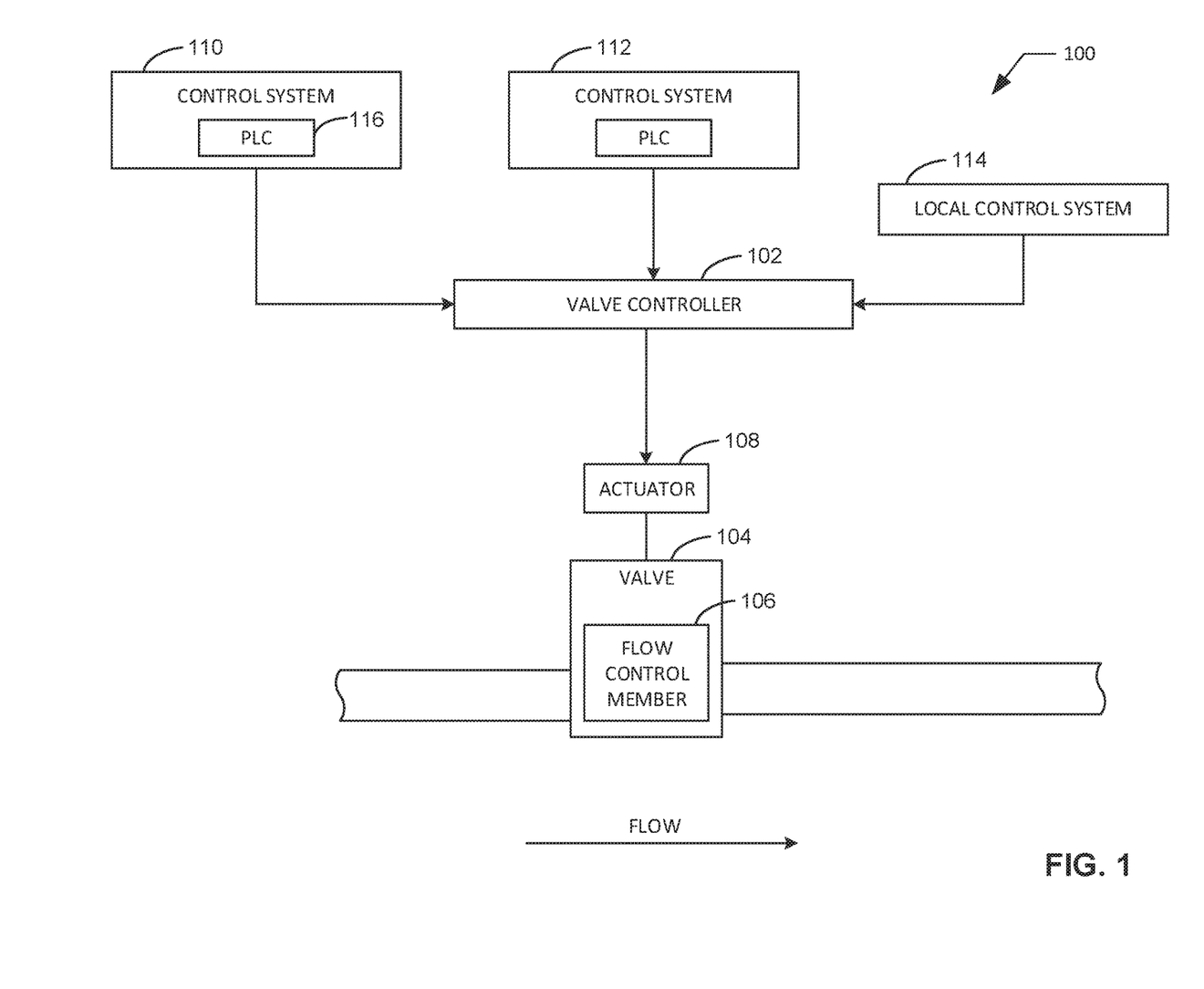
FIG. 1 is a first example process control environment for coordinating operation of a valve.

FIG. 1 is a first example process control environment 100 including an example valve controller 102 for coordinating the operation of a valve amongst multiple control systems. In the illustrated example of FIG. 1, the process control environment 100 includes the valve controller 102, a first example valve 104 having a first example flow control member 106, a first example actuator 108, a first example control system 110, a second example control system 112, and a local control system 114.

In the illustrated example of FIG. 1, the valve controller 102 is operatively coupled to the first actuator 108, the first control system 110, the second control system 112, and the local control system 114. The valve controller 102 is also operatively coupled to the first valve 104 (e.g., a control valve, an isolation valve, etc.) via the first actuator 108. Thus, the valve controller 102 of FIG. 1 may control the first valve 104 via communications (e.g., signals, messages, etc.) transmitted from the valve controller 102 to the first actuator 108.

For example, in response to a control signal (e.g., a pneumatic control signal, a hydraulic control signal, an electrical control signal, etc.) transmitted from the valve controller 102 to the first actuator 108 (e.g., a pneumatic actuator, a hydraulic actuator, a solenoid, etc.), the first actuator 108 moves and/or adjusts a position of the first flow control member 106 (e.g., a plug, a disk, a ball, etc.) of the first valve 104 such that the position of the first flow control member 106 matches a desired position (e.g., a closed position) indicated by the control signal.

Although the example process control environment 100 of FIG. 1 illustrates a specific number of control systems, valves, specific valve types, and a specific arrangement of the control systems and valve types relative to one another, in other examples the process control environment may include any number of additional control systems, valves, any number of valve types, and any arrangement of the control systems and valve types relative to one another.

The valve controller 102 of FIG. 1 controls a position of the first valve 104 based on an example control signal received by the valve controller 102 from a programmable logic circuit (PLC) 116 and/or, more generally, from the first control system 110. In some examples, the control signal corresponds to a set point associated with a position of the first valve 104 (e.g., a desired position of the first valve 104). In the illustrated example of FIG. 1, the control signal includes and/or carries data and/or information to control the position of the first flow control member 106 of the first valve 104.

For example, during an automatic mode operation, the control signal from the first control system 110 of FIG. 1 may indicate to the valve controller 102 that the first flow control member 106 of the first valve 104 is to be in an open position. As such, the valve controller 102 of the illustrated example instructs the actuator 108 to adjust the position of the first flow control member 106 of the first valve 104 such that the position of the first flow control member 106 matches the open position. During the automatic mode operation, the valve controller 102 may continue to operate the flow control member 106 of the first valve 104 between an open position and a closed position, for example. In some examples, the valve controller 102 may operate the flow control member 106 of the first valve 104 between various positions to increase/decrease fluid flow through the first valve 104.

To operate the first valve 104 in manual mode, one of the control systems (e.g., the first control system 110, the second control system 112, and the local control system 114) sends a control signal to the valve controller 102 requesting to operate the first valve 104 in manual mode. In response to the requesting one of the control systems, the valve controller 102 gives that control system exclusive control to operate the first valve 104. For example, the first control system 110 may send a control signal to the valve controller 102 requesting to operate the first valve 104 in manual mode. In the illustrated example of FIG. 1, the valve controller 102 gives the first control system 110 exclusive control to operate the first valve 104. Further, the second control system 112 may send a control signal to the valve controller 102 requesting to operate the first valve 104. The valve controller 102 of the illustrated example sends a response to the second control system 112 indicating that the first control system 110 has exclusive control to operate the first valve 104, and that the first control system 110 is operating the first valve 104 in manual mode. In some examples, the first control system 110 may have exclusive control to operate the first valve 104 until the first control system 110 sends a control signal to the valve controller 102 to return the first valve 104 to automatic mode operation. Alternatively, the valve controller 102 may return the first valve 104 to an automatic mode operation after a period of time, revoking the exclusive control of the first control system 110, for example. In some examples, the valve controller 102 may determine that the first control system 110 is offline (e.g., loses connectivity, a bad network connection, taken offline, etc.). As such, the valve controller 102 may return the first valve 104 to an automatic mode operation after a period of time, revoking the exclusive control of the first control system 110, for example. In some examples, the first control system 110 may have exclusive control to operate the first valve 104 and an event may occur. During the event, the second control system 112 may send a control signal to the valve controller 102 requesting to operate the first valve 104. The valve controller 102 of the illustrated example sends a response to the second control system 112 indicating that the first control system 110 has exclusive control to operate the first valve 104. The second control system 112 may send a request to the first control system 110 requesting to operate the first valve 104. In the illustrated example, the first control system 110 sends a control signal to the valve controller 102 to return the first valve 104 to automatic mode operation. As such, the second control system 112 can send a control signal to the valve controller 102 requesting to operate the first valve 104, and the valve controller 102 may give the second control system 112 exclusive control to operate the first valve 104 to address the event.

In some examples, the first control system 110 may have exclusive control to operate the first valve 104 and an event may occur. During the event, the local control system 114 may be utilized to operate the first valve 104. As such, the local control system 114 may override the first control system 110 to operate the first valve 104 to address the event.

Figure 2:
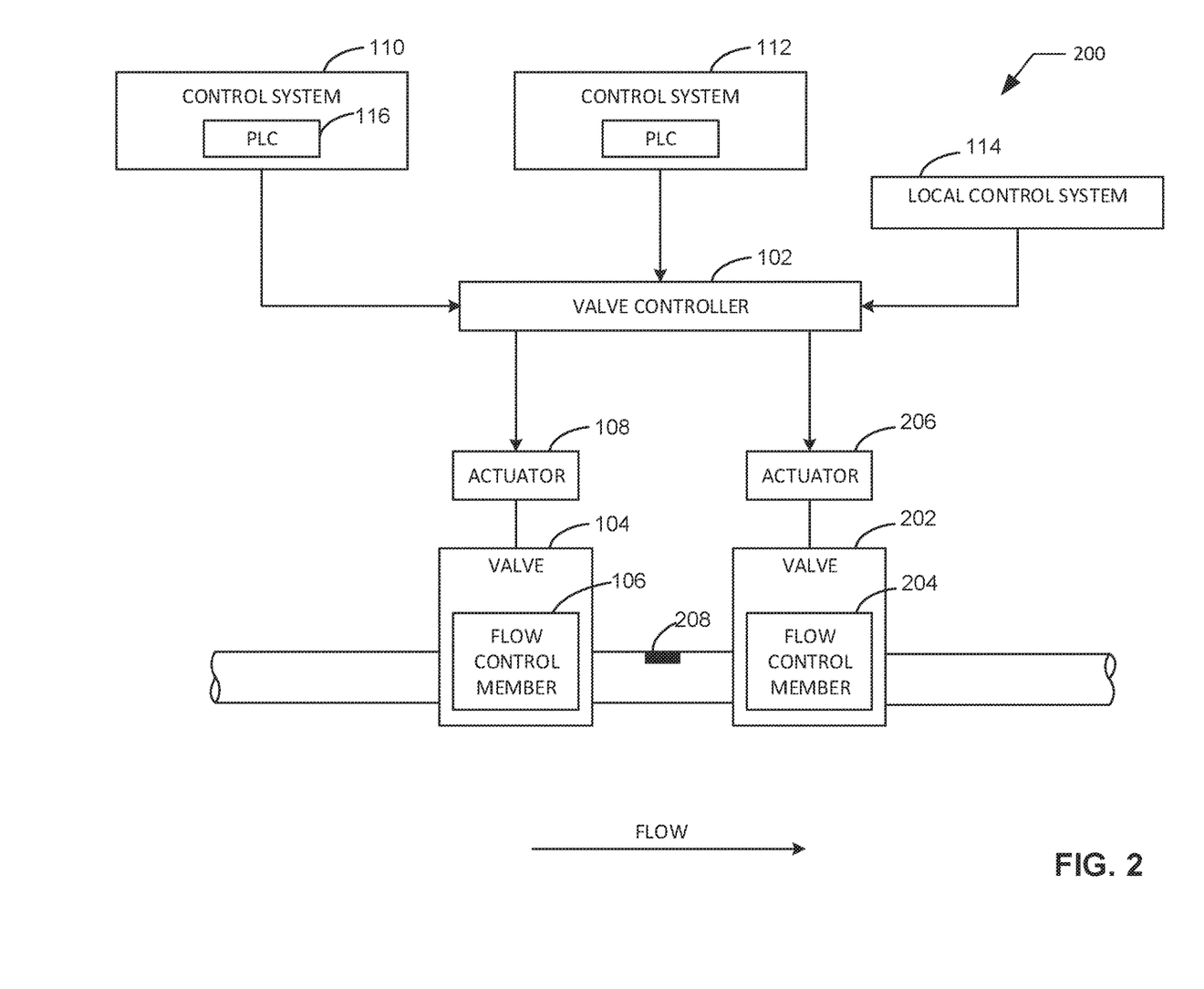
FIG. 2 is a second example process control environment for coordinating operation of valves.

FIG. 2 is a second example process control environment 200 including the example valve controller 102 of FIG. 1. In the illustrated example of FIG. 2, the process control environment 200 includes the valve controller 102, the first example valve 104 having the first example flow control member 106, the first example actuator 108, the first example control system 110, the second example control system 112, and the local control system 114 of the first example process control environment 100 of FIG. 1 described above, and further includes a second example valve 202 having a second example flow control member 204, and a second example actuator 206.

In the illustrated example of FIG. 2, the valve controller 102 is operatively coupled to the first actuator 108, the second actuator 206, the first control system 110, the second control system 112, and the local control system 114. The valve controller 102 of FIG. 2 is also operatively coupled to the first valve 104 via the first actuator 108, and to the second valve 202 via the second actuator 206. Thus, the valve controller 102 of FIG. 2 may control the first valve 104, and/or the second valve 202 via communications (e.g., signals, messages, etc.) transmitted from the valve controller 102 to the corresponding first actuator 108 and/or the corresponding second actuator 206.

For example, in response to a control signal (e.g., a pneumatic control signal, a hydraulic control signal, an electrical control signal, etc.) transmitted from the valve controller 102 to the first actuator 108 (e.g., a pneumatic actuator, a hydraulic actuator, a solenoid, etc.), the first actuator 108 moves and/or adjusts a position of the first flow control member 106 (e.g., a plug, a disk, a ball, etc.) of the first valve 104 such that the position of the first flow control member 106 matches a desired position (e.g., a closed position) indicated by the control signal. As another example, in response to a control signal (e.g., a pneumatic control signal, a hydraulic control signal, an electrical control signal, etc.) transmitted from the valve controller 102 to the second actuator 206 (e.g., a pneumatic actuator, a hydraulic actuator, a solenoid, etc.), the second actuator 206 moves and/or adjusts a position of the second flow control member 204 (e.g., a plug, a disk, a ball, etc.) of the second valve 202 such that the position of the second flow control member 204 matches a desired position (e.g., a closed position) indicated by the control signal. As another example, in response to a control signal (e.g., a pneumatic control signal, a hydraulic control signal, an electrical control signal, etc.) transmitted from the valve controller 102.

In the illustrated example of FIG. 2, the second valve 202 is operatively positioned in series with the first valve 104. For example, the second valve 202 may be positioned in series with the first valve 104 such that a process fluid traveling in the flow direction as shown in FIG. 2 passes through the first valve 104, then through the second valve 202, when the first valve 104 and the second valve 202 are in open positions. In the illustrated example of FIG. 2, the first valve 104 is an isolation valve and the second valve 202 is a control valve. In other examples, the first valve 104 may be a type of valve other than an isolation valve (e.g., a control valve, etc.) and the second valve 202 may be a type of valve other than a control valve (e.g., an isolation valve, etc.). Although the example process control environment 200 of FIG. 2 illustrates a specific number of control systems, valves, specific valve types, and a specific arrangement of the control systems and valve types relative to one another, in other examples the process control environment may include any number of additional control systems, valves, any number of valve types, and any arrangement of the control systems and valve types relative to one another.

The valve controller 102 of FIG. 2 controls a position of the first valve 104 and a position of the second valve 202 based on control signals received by the valve controller 102 from the PLC 116 and/or, more generally, from the first control system 110. In some examples, the control signal corresponds to a set point associated with a position of the first valve 104 (e.g., a desired position of the first valve 104), and/or a set point associated with a position of the second valve 202 (e.g., a desired position of the second valve 202). In the illustrated example of FIG. 2, the control signal includes and/or carries data and/or information to control the respective positions of corresponding ones of the first flow control member 106 of the first valve 104 and the second flow control member 204 of the second valve 202.

For example, during an automatic mode operation, the control signal from the first control system 110 of FIG. 2 may indicate to the valve controller 102 that the first flow control member 106 of the first valve 104 and the second flow control member 204 of the second valve 202 are to be in open positions. As such, the valve controller 102 of the illustrated example instructs the actuator 108 to adjust the position of the first flow control member 106 of the first valve 104 and instructs the actuator 206 to adjust the position of the second flow control member 204 of the second valve 202 such that the positions of the first flow control member 106 and the second flow control member 204 match the respective open positions. During automatic mode operation, the valve controller 102 may continue to operate each of the flow control member 106 of the first valve 104 and the second flow control member 204 of the second valve 202 between an open position and a closed position, for example. In some examples, the valve controller 102 may operate the flow control member 106 of the first valve 104 and the flow control member 204 of the second valve 202 between various positions to increase/decrease fluid flow through the first valve 104 and the second valve 202 during an automatic mode.

To operate the first valve 104 and/or the second valve 202 in manual mode, one of the control systems (e.g., the first control system 104, the second control system 112, or the local control system 114) sends a control signal to the valve controller 102 requesting to operate the first valve 104 and/or the second valve 202 in manual mode. In response to the requesting one of the control systems, the valve controller 102 gives that control system exclusive control to operate the first valve 104 and/or the second valve 202. For example, the first control system 110 sends a control signal to the valve controller 102 requesting to operate the first valve 104 and the second valve 202 in manual mode. In the illustrated example of FIG. 2, the valve controller 102 gives the first control system 110 exclusive control to operate the first valve 104 and the second valve 202. Further, the second control system 112 may send a control signal to the valve controller 102 requesting to operate the first valve 104. The valve controller 102 of the illustrated example sends a response to the second control system 112 indicating that the first control system 110 has exclusive control to operate the first valve 104 and the second valve 202. In some examples, the first control system 110 may have exclusive control to operate the first valve 104 until the first control system 110 sends a control signal to the valve controller 102 operating the first valve 104 back to automatic mode. As such, the second control system 112 may request to operate the first valve 104 and the valve controller 102 may give the second control system 112 exclusive control to operate the first valve 104. Thus, the first control system 110 may have exclusive control to operate the second valve 202 and the second control system 112 may have exclusive control to operate the first valve 104. Alternatively, the valve controller 102 may return the first valve 104 and the second valve 202 to an automatic mode operation after a period of time, revoking exclusive control of the first control system 110, for example. In some examples, the valve controller 102 may determine that the first control system 110 is offline (e.g., loses connectivity, a bad network connection, taken offline, etc.). As such, the valve controller 102 may return the first valve 104 and the second valve 202 to an automatic mode operation after a period of time, revoking the exclusive control of the first control system 110, for example.

In some examples, the first control system 110 may have exclusive control to operate the first valve 104 and the second valve 202 and an event may occur. During the event, the second control system 112 may send a control signal to the valve controller 102 requesting to operate the first valve 104. The valve controller 102 of the illustrated example sends a response to the second control system 112 indicating that the first control system 110 has exclusive control to operate the first valve 104. The second control system 112 may send a request to the first control system 110 requesting control to operate the first valve 104. In the illustrated example, the first control system 110 sends a control signal to the valve controller 102 to operate the first valve 104 back to automatic mode. As such, the second control system 112 can send a control signal to the valve controller 102 requesting to operate the first valve 104, and the valve controller 102 may give the second control system 112 exclusive control to operate the first valve 104 to address the event while still giving the first control system 110 exclusive control to the second valve 202.

In some examples, the first control system 110 may have exclusive control to operate the first valve 104 and the second valve 202, and an event may occur. During the event, the local control system 114 may be utilized to operate the first valve 104 and/or the second valve 202. As such, the local control system 114 may override the first control system 110 to operate the first valve 104 and/or the second valve 202 to address the event.

In the illustrated example of FIG. 2, a first transmitter 208 is operatively positioned between the first valve 104 and the second valve 202. The first transmitter 208 may sense, measure and/or detect first process data (e.g., one or more pressure value(s), one or more flow value(s), one or more temperature value(s), etc.) between the first valve 104 and the second valve 202. For example, when the first transmitter 208 is implemented as a pressure transmitter, the first transmitter 208 may sense, measure and/or detect first pressure data corresponding to the pressure between the first valve 104 and the second valve 202. The first transmitter 208 may respectively transmit the first process data (e.g. via wired or wireless connections) to the valve controller 102 and/or the first control system 110. In some examples, the first process data may include and/or be indicative of diagnostic information corresponding to the availability of the second valve 202 for servicing. For example, first pressure data respectively corresponding to a pressure sensed, measured and/or detected at the first transmitter 208 may be indicative of the first valve 104 and the second valve 202 having successfully shut off the flow of the process fluid (e.g., such that the process fluid is no longer flowing between the first valve 104 and the second valve 202), thus making the second valve 202 available for servicing during a manual mode.

Figure 3:
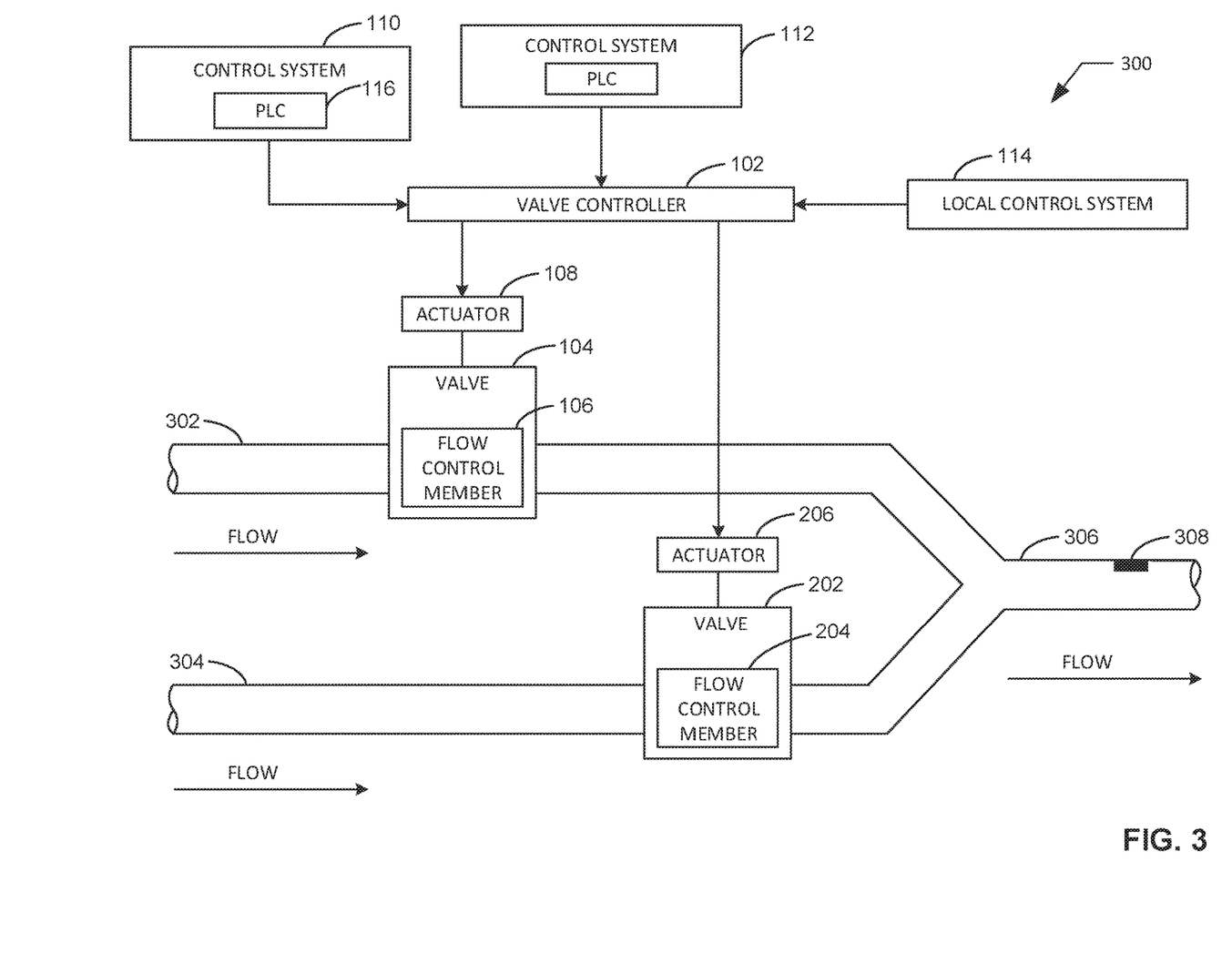
FIG. 3 is a third example process control environment for coordinating operation of valves.

FIG. 3 is a third example process control environment 300 including the example valve controller 102 of FIG. 1. In the illustrated example of FIG. 3, the process control environment 300 includes the valve controller 102, the first example valve 104 having the first example flow control member 106, the first example actuator 108, the first example control system 110, the second example control system 112, and the local control system 114 of the first example process control environment 100 of FIG. 1 described above, and further including the second example valve 202 having the second example flow control member 204, and the second example actuator 206 of the second example process control environment 200 of FIG. 2.

In the illustrated example of FIG. 3, the valve controller 102 is operatively coupled to the first actuator 108, the second actuator 206, the first control system 110, the second control system 112, and the local control system 114. The valve controller 102 of FIG. 3 is also operatively coupled to the first valve 104 via the first actuator 108, and the second valve 202 via the second actuator 206. Thus, the valve controller 102 of FIG. 3 may control the first valve 104, and/or the second valve 202 via communications (e.g., signals, messages, etc.) transmitted from the valve controller 102 to the first actuator 108 and/or the second actuator 206.

For example, in response to a control signal (e.g., a pneumatic control signal, a hydraulic control signal, an electrical control signal, etc.) transmitted from the valve controller 102 to the first actuator 108 (e.g., a pneumatic actuator, a hydraulic actuator, a solenoid, etc.), the first actuator 108 moves and/or adjusts a position of the first flow control member 106 (e.g., a plug, a disk, a ball, etc.) of the first valve 104 such that the position of the first flow control member 106 matches a desired position (e.g., a closed position) indicated by the control signal. As another example, in response to a control signal (e.g., a pneumatic control signal, a hydraulic control signal, an electrical control signal, etc.) transmitted from the valve controller 102 to the second actuator 206 (e.g., a pneumatic actuator, a hydraulic actuator, a solenoid, etc.), the second actuator 206 moves and/or adjusts a position of the second flow control member 204 (e.g., a plug, a disk, a ball, etc.) of the second valve 202 such that the position of the second flow control member 204 matches a desired position (e.g., a closed position) indicated by the control signal.

In the illustrated example of FIG. 3, the second valve 202 is operatively positioned in parallel with the first valve 104. For example, the second valve 202 may be positioned in parallel with the first valve 104 such that a first process fluid traveling in an example flow direction within an example first flow line 302 of FIG. 3 passes through the first valve 104, a second process fluid traveling in the flow direction within an example second flow line 304 of FIG. 3 passes through the second valve 202, and the first and the second process fluids travelling through the first and second flow lines 302, 304 merge together at an example blended flow line 306 of FIG. 3. In the illustrated example of FIG. 3, the first valve 104 is an isolation valve, the second valve 202 is a control valve. In other examples, the first valve 104 may be a type of valve other than an isolation valve (e.g., a control valve, etc.), the second valve 202 may be a type of valve other than a control valve (e.g., an isolation valve, etc.). Although the example process control environment 300 of FIG. 3 illustrates a specific number of control systems, valves, specific valve types, and a specific arrangement of the control systems and valve types relative to one another, in other examples the process control environment may include any number of additional control systems, valves, any number of valve types, and any arrangement of the control systems and valve types relative to one another.

The valve controller 102 of FIG. 3 controls a position of the first valve 104 and a position of the second valve 202 based on control signals received by the valve controller 102 from the PLC 116 and/or, more generally, from the first control system 110, for example. In some examples, the control signal corresponds to a set point associated with a position of the first valve 104 (e.g., a desired position of the first valve 104), and/or a set point associated with a position of the second valve 202 (e.g., a desired position of the second valve 202). In the illustrated example of FIG. 2, the control signal includes and/or carries data and/or information to control the respective positions of the first flow control member 106 of the first valve 104 and the second flow control member 204 of the second valve 202.

For example, during an automatic mode operation, the control signal from the first control system 110 of FIG. 1 may indicate to the valve controller 102 that the first flow control member 106 of the first valve 104 and the second flow control member 204 of the second valve 202 are to be in open positions. As such, the valve controller 102 of the illustrated example instructs the actuator 108 to adjust the position of the first flow control member 106 of the first valve 104 and instructs the actuator 206 to adjust the position of the second flow control member 204 of the second valve 202 such that the positions of the first flow control member 106 and the second flow control member 204 match the respective open positions. During automatic mode operation, the valve controller 102 may continue to operate each of the flow control member 106 of the first valve 104 and the second flow control member 204 of the second valve 202 between an open position and a closed position, for example. In some examples, the valve controller 102 may operate the flow control member 106 of the first valve 104 and the flow control member 204 of the second valve 202 between various positions to increase/decrease fluid flow through the first valve 104 and the second valve 202 during an automatic mode operation.

To operate the first valve 104 and/or the second valve 202 in manual mode, one of the control systems (e.g., the first control system 110, the second control system 112 or the local control system 114) sends a control signal to the valve controller 102 requesting to operate the first valve 104 and/or the second valve 202 in manual mode. In response to the requesting one of the control systems, the valve controller 102 gives that control system exclusive control to operate the first valve 104 and/or the second valve 202. For example, the first control system 110 may send a control signal to the valve controller 102 requesting to operate the first valve 104 and the second valve 202 in manual mode. In the illustrated example of FIG. 3, the valve controller 102 gives the first control system 110 exclusive control to operate the first valve 104 and the second valve 202. Further, the second control system 112 may send a control signal to the valve controller 102 requesting to operate the first valve 104. The valve controller 102 of the illustrated example sends a response to the second control system 112 indicating that the first control system 110 has exclusive control to operate the first valve 104 and the second valve 202. In some examples, the first control system 110 may have exclusive control to operate the first valve 104 until the first control system 110 sends a control signal to the valve controller 102 causing the first valve 104 to return to automatic mode operation. As such, the second control system 112 may request to operate the first valve 104 and the valve controller 102 may give the second control system 112 exclusive control to operate the first valve 104. Thus, the first control system 110 may have exclusive control to operate the second valve 202 and the second control system 112 may have exclusive control to operate the first valve 104. Alternatively, the valve controller 102 may return the first valve 104 and the second valve 202 back to an automatic mode operation after a period of time, revoking the exclusive control of the first control system 110, for example. In some examples, the valve controller 102 may determine that the first control system 110 is offline (e.g., loses connectivity, a bad network connection, taken offline, etc.). As such, the valve controller 102 may return the first valve 104 and the second valve 202 to an automatic mode operation after a period of time, revoking the exclusive control of the first control system 110, for example.

In some examples, during a manual mode, the first control system 110 may have exclusive control to operate the first valve 104 and the second valve 202 and an event may occur. During the event, the second control system 112 may send a control signal to the valve controller 102 requesting to operate the first valve 104. The valve controller 102 of the illustrated example sends a response to the second control system 112 indicating that the first control system 110 has exclusive control to operate the first valve 104. The second control system 112 may send a request to the first control system 110 requesting control to operate the first valve 104. In the illustrated example, the first control system 110 sends a control signal to the valve controller 102 to return the first valve 104 to automatic mode operation. As such, the second control system 112 can send a control signal to the valve controller 102 requesting to operate the first valve 104, and the valve controller 102 may give the second control system 112 exclusive control to operate the first valve 104 to address the event while still giving the first control system 110 exclusive control to the second valve 202.

In some examples, the first control system 110 may have exclusive control to operate the first valve 104 and the second valve 202 and an event may occur. During the event, the local control system 114 may be utilized to operate the first valve 104 and/or the second valve 202. As such, the local control system 114 may override the first control system 110 to operate the first valve 104 and/or the second valve 202 to address the event.

In the illustrated example of FIG. 3, the first control system 110 may have exclusive control to operate the first valve 104 and the second valve 202. In some examples, the first control system 110 may operate the first valve 104 and the second valve 202 between various positions to increase/decrease fluid flow through blended flow line 306. For example, the first control system 110 may be operating the first valve 104 and the second valve 202 at a 50% open position. An event may occur that requires the first valve 104 to be serviced. As such, the first control system 110 may operate the first valve 104 to a 0% open position (e.g. closed position), and may operate the second valve 202 to a 100% open position to maintain the fluid flow through the blended flow line 306, for example. In the illustrated example, after the first valve 104 has been serviced, the first control system 110 may operate the first valve 104 and the second valve 202 back to the 50% open position, and operate the first valve 104 and the second valve 202 back to automatic mode.

In the illustrated example of FIG. 3, an example transmitter 308 is operatively positioned downstream from the first valve 104 and the second valve 202 within the blended flow line 306 of FIG. 3. The transmitter 308 may sense, measure and/or detect process data (e.g., one or more pressure value(s), one or more flow value(s), one or more temperature value(s), one or more density value(s), one or more viscosity value(s), one or more opacity value(s), etc.) of the merged process fluid traveling through the blended flow line 306 of FIG. 3. For example, when implemented as a temperature transmitter, the transmitter 308 may sense, measure and/or detect temperature data corresponding to the temperature of the merged process fluid traveling through the blended flow line 306 of FIG. 3. The transmitter 308 may transmit the process data (e.g. via a wired or wireless connection) to the valve controller 102 and/or the control system 110. In some examples, the transmitted process data (e.g., a measured and/or sensed temperature value) may be compared (e.g., via the control system 110) to a process data set point (e.g., a temperature set point). In instances when the transmitted process data does not match the process data set point, the control system 110 may respond by generating a control signal to modulate the respective positions of the first and/or second valves 104, 202 of FIG. 3 to cause the merged process fluid traveling though the blended flow line 306 of FIG. 3 to demonstrate the desired process data (e.g., process data that matches the process data set point).

While an example manner of implementing the example valve controller 102 is illustrated in FIGS. 1, 2, and/or 3, one or more of the elements, processes and/or devices illustrated in FIGS. 1, 2, and/or 3 may be combined, divided, re-arranged, omitted, eliminated and/or implemented in any other way. Further, the valve controller 102 of FIGS. 1, 2, and/or 3 may be implemented by hardware, software, firmware and/or any combination of hardware, software and/or firmware. Thus, for example, the valve controller 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, the valve controller 102 is hereby expressly defined to include a tangible computer readable storage device or storage disk such as a memory, a digital versatile disk (DVD), a compact disk (CD), a Blu-ray disk, etc. storing the software and/or firmware. Further still, the example valve controller 102 of FIGS. 1, 2, and/or 3 may include one or more elements, processes and/or devices in addition to, or instead of, those illustrated in FIGS. 1, 2, and/or 3, and/or may include more than one of any or all of the illustrated elements, processes and devices.

Figure 4:
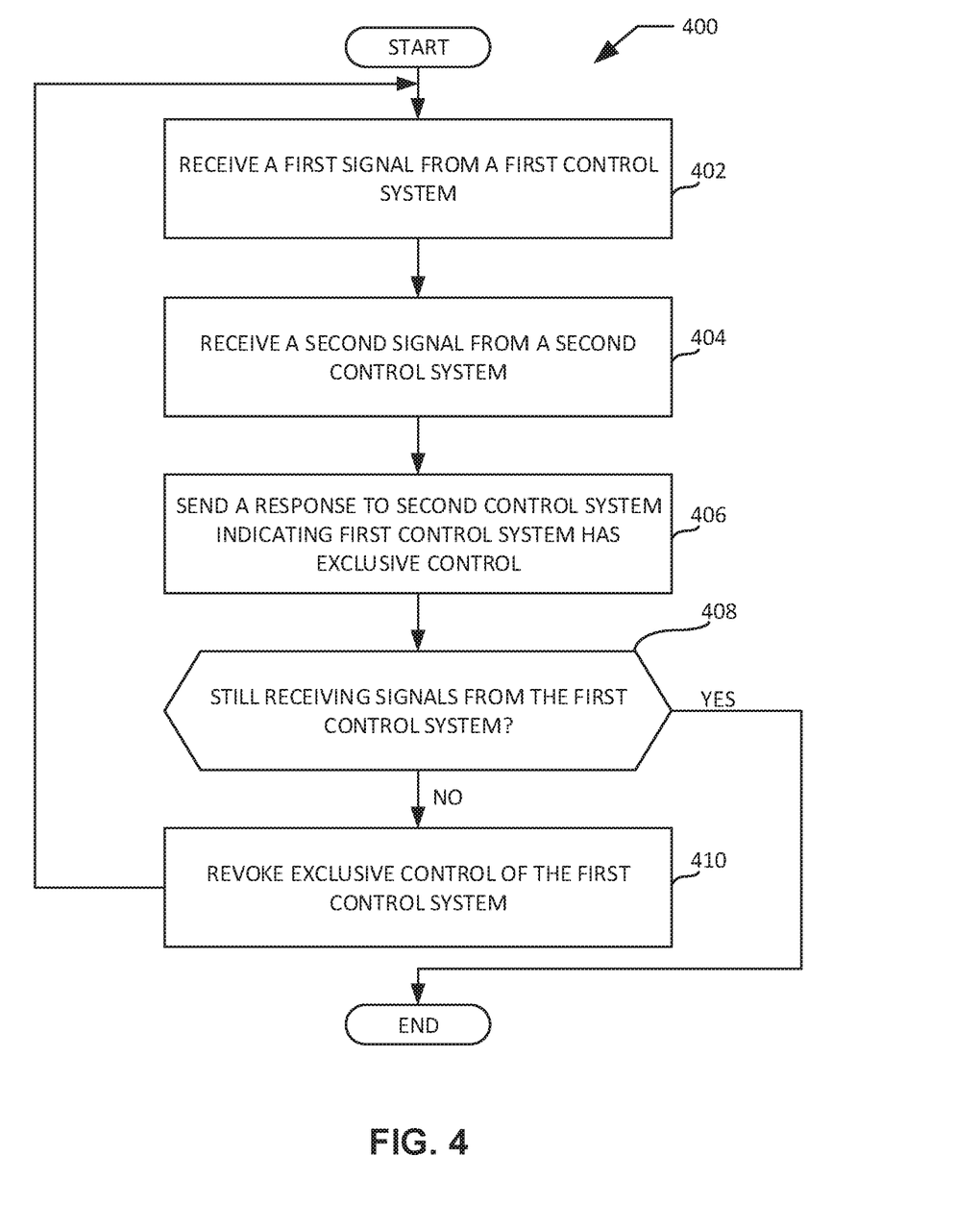
FIG. 4 is a flowchart representative of an example method that may be executed at the example valve controllers of FIGS. 1, 2 and/or 3 to coordinate operation of valves.

A flowchart representative of an example method 400 for coordinating the operation of valves is shown in FIG. 4. In this example, the method 400 may be implemented using machine-readable instructions that comprise one or more program(s) for execution by a controller or processor such as the example processor 502 shown in the example processor platform 500 discussed below in connection with FIG. 5. The one or more program(s) may be embodied in software stored on a tangible computer readable storage medium such as a CD-ROM, a floppy disk, a hard drive, a digital versatile disk (DVD), a Blu-ray disk, or a memory associated with the processor 502, but the entire program(s) and/or parts thereof could alternatively be executed by a device other than the processor 502 and/or embodied in firmware or dedicated hardware. Further, although the example program(s) is/are described with reference to the flowchart illustrated in FIG. 4, many other methods for coordinating the operation of valves may alternatively be used. For example, the order of execution of the blocks may be changed, and/or some of the blocks described may be changed, eliminated, or combined.

As mentioned above, the example method 400 of FIG. 4 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 4 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method 400 of FIG. 4 that be executed at the example valve controller 102 of FIGS. 1, 2 and/or 3 to coordinate the operation of valves. The example method 400 of FIG. 4 begins when the valve controller 102 of FIGS. 1, 2 and/or 3 receives a first signal from a first control system (block 402). For example, the valve controller 102 of FIGS. 1, 2 and/or 3 receives a first signal from the first control system 110 requesting to change an operating state of the first valve 104. The valve controller 102 of FIGS. 1, 2 and/or 3 provides the first control system 110 exclusive control of the first valve 104.

At block 404, the valve controller 102 of FIGS. 1, 2 and/or 3 receives a second signal from a second control system. For example, the valve controller 102 of FIGS. 1, 2 and/or 3 receives a second signal from the second control system 112 requesting permission to operate the first valve 104.

At block 406, the valve controller 102 of FIGS. 1, 2 and/or 3 sends a response to the second control system. For example, the valve controller 102 of FIGS. 1, 2 and/or 3 sends a response to the second control system 112 indicating that the first control system 110 has exclusive control of the first valve 104 and has changed an operating state of the first valve 104.

At block 408, the valve controller 102 of FIGS. 1, 2 and/or 3 determines if it is still receiving signals from the first control system. For example, the valve controller 102 of FIGS. 1, 2 and/or 3 determines if it is still receiving signals from the first control system 110 indicating that the first control system 110 is still online. If the valve controller 102 of FIGS. 1, 2 and/or 3 determines that it is still receiving signals from the first control system, the example method 400 ends. However, if the valve controller 102 of FIGS. 1, 2 and/or 3 determines that it is not still receiving signals from the first control system, the valve controller 102 of FIGS. 1, 2 and/or 3 revokes exclusive control of the first control system (block 410) and the method returns to block 402. For example, the valve controller 102 of FIGS. 1, 2 and/or 3 determines it is not still receiving signals from the first control system 110 indicating that the first control system 110 is offline. As such, the valve controller 102 of FIGS. 1, 2 and/or 3 revokes exclusive control of the first control system 110, for example.

Figure 5:
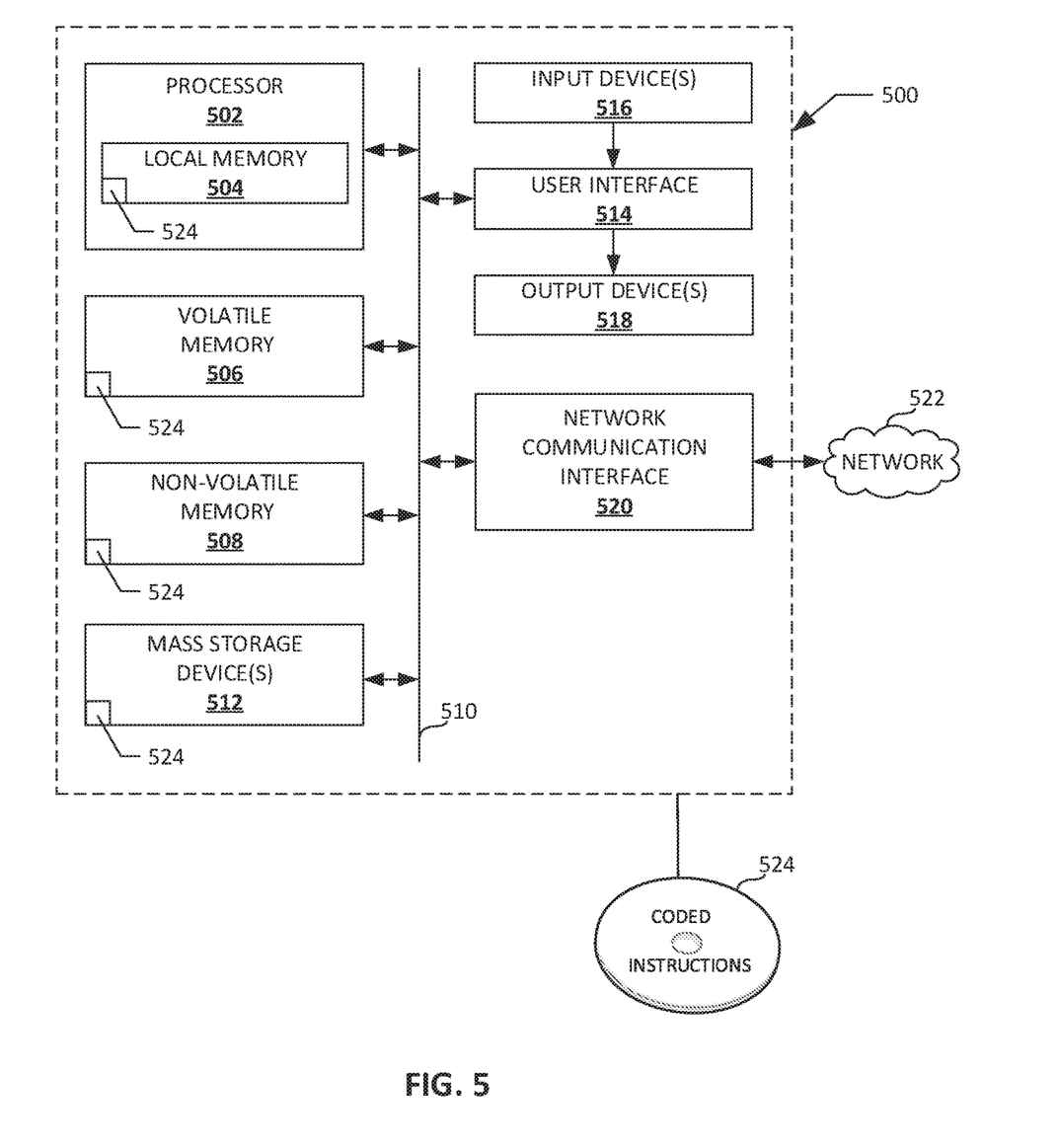
FIG. 5 is an example processor platform capable of executing instructions to implement the method of FIG. 4 and the example valve controllers of FIGS. 1, 2 and/or 3.

FIG. 5 is an example processor platform 500 capable of executing instructions to implement the method 400 of FIG. 4 and the example valve controller 102 of FIGS. 1, 2 and/or 3. The processor platform 500 of the illustrated example includes an example processor 502. The processor 502 of the illustrated example is hardware. For example, the processor 502 can be implemented by one or more integrated circuits, logic circuits, microprocessors or controllers from any desired family or manufacturer. The processor 502 of the illustrated example includes a local memory 504 (e.g., a cache).

The processor 502 of the illustrated example is in communication with a main memory including a volatile memory 506 and a non-volatile memory 508 via a bus 510. The volatile memory 506 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 508 may be implemented by flash memory and/or any other desired type of memory device. Access to the volatile memory 506 and the non-volatile memory 508 is controlled by a memory controller.

The processor 502 of the illustrated example is also in communication with one or more mass storage devices 512 for storing software and/or data. Examples of such mass storage devices 512 include floppy disk drives, hard drive disks, compact disk drives, Blu-ray disk drives, RAID systems, and digital versatile disk (DVD) drives.

The processor platform 500 of the illustrated example also includes a user interface circuit 514. The user interface circuit 514 may be implemented by any type of interface standard, such as an Ethernet interface, a universal serial bus (USB), and/or a PCI express interface. In the illustrated example, one or more example input device(s) 516 are connected to the user interface circuit 514. The input device(s) 516 permit(s) a user to enter data and commands into the processor 502. The input device(s) 516 can be implemented by, for example, one or more buttons, one or more switches, a keyboard, a mouse, a microphone and/or a liquid crystal display having a touchscreen. One or more example output device(s) 518 are also connected to the user interface circuit 514 of the illustrated example. The output device(s) 518 can be implemented, for example, by one or more light emitting diode(s) for presenting visual information, one or more speaker(s) for presenting audible information, and/or a display device (e.g., a liquid crystal display, a cathode ray tube display, etc.) for presenting textual and/or graphical information. The user interface circuit 514 of the illustrated example may, thus, include a graphics driver such as a graphics driver chip and/or processor.

The processor platform 500 of the illustrated example also includes a network communication interface circuit 520 to facilitate the exchange of data and/or signals with external machines via a network 522. In some examples, the network 522 may be facilitated via 4-20 mA wiring and/or via one or more communication protocol(s) including, for example, Foundation Fieldbus, Highway Addressable Remote Transducer (HART), Transmission Control Protocol/Internet Protocol (TCP/IP), Profinet, Modbus and/or Ethernet.

Coded instructions 524 for implementing the method 400 of FIG. 4 may be stored in the local memory 504, in the volatile memory 506, in the non-volatile memory 508, in the mass storage device 512, and/or on a removable tangible computer readable storage medium such as a CD or DVD.

From the foregoing, it will be appreciated that the disclosed methods and apparatus advantageously provide the ability to coordinate the operation of valves amongst multiple control systems. For example, because the disclosed valve controller receives a first signal from a first control system to operate a valve and provides the first control system exclusive control of the valve, other control systems are unable to control the valve. Accordingly, the first control system is the exclusive operator of the valve and may not be overridden by another control system, unless the valve is operated locally. Additionally, because the disclosed valve controller sends responses indicating which control system has exclusive control of the valve, any requesting control system can quickly identify which control system is operating the valve during emergency situations, for example. The disclosed methods and apparatus increase safety and operation of process control environments by coordinating the operation of valves.

Although certain example apparatus and methods have been disclosed herein, the scope of coverage of this patent is not limited thereto. On the contrary, this patent covers all apparatus and methods fairly falling within the scope of the claims of this patent.

What is claimed is:

1. An apparatus comprising:
a valve controller configured to:
receive a first signal from a first control system to change an operating state of a valve, the valve controller is to provide the first control system exclusive control of the valve;
receive a second signal from a second control system requesting permission to operate the valve; and
send a response to the second control system indicating the first control system has exclusive control of the valve and has changed an operating state of the valve.

2. The apparatus of claim 1, wherein the first control system and the second control system are communicatively coupled to the valve controller.

3. The apparatus of claim 1, wherein the first control system is to operate using a first communication protocol, the second control system is to operate using a second communication protocol different than the first communication protocol.

4. The apparatus of claim 1, wherein the first control system is to change the operating state of the valve from an automatic mode to a manual mode.

5. The apparatus of claim 1, further including a local control system coupled to the valve controller.

6. The apparatus of claim 5, wherein the local control system is to override the first control system to operate the valve.

7. The apparatus of claim 1, wherein the valve controller is to send a response indicating the first control system no longer has exclusive control of the valve after a period of time.

8. A method comprising:
receiving a first signal from a first control system at a valve controller to change an operating state of a valve, the valve controller is to provide the first control system exclusive control of the valve;
receiving a second signal from a second control system at the valve controller requesting permission to operate the valve; and
sending a response to the second control system indicating the first control system has exclusive control of the valve and has changed an operating state of the valve.

9. The method of claim 8, wherein the first control system and the second control system are communicatively coupled to the valve controller.

10. The method of claim 8, wherein the first control system is to operate using a first communication protocol, the second control system is to operate using a second communication protocol different than the first communication protocol.

11. The method of claim 8, wherein the first control system is to change the operating state of the valve from an automatic mode to a manual mode.

12. The method of claim 8, further including a local control system coupled to the valve controller.

13. The method of claim 12, wherein the local control system is to override the first control system to operate the valve.

14. The method of claim 8, further including sending a response to the first and second control systems indicating the first control system no longer has exclusive control of the valve after a period of time.

15. A non-transitory computer readable medium comprising instructions that, when executed, configured to cause a valve controller to, at least:
receive a first signal from a first control system to change an operating state of a valve, the valve controller is to provide the first control system exclusive control of the valve;
receive a second signal from a second control system requesting permission to operate the valve; and
send a response to the second control system indicating the first control system has exclusive control of the valve and has changed an operating state of the valve.

16. The computer readable medium as defined claim 15, wherein the first control system and the second control system are communicatively coupled to the valve controller.

17. The computer readable medium as defined claim 15, wherein the first control system is to operate using a first communication protocol, the second control system is to operate using a second communication protocol different than the first communication protocol.

18. The computer readable medium as defined claim 15, wherein the first control system is to change the operating state of the valve from an automatic mode to a manual mode.

19. The computer readable medium as defined claim 15, further including a local control system coupled to the valve controller.

20. The computer readable medium as defined claim 19, wherein the local control system is to override the first control system to operate the valve.

* * * * *